United States Patent [19]
Martin, Jr.

[11] 4,215,178
[45] Jul. 29, 1980

[54] NON-STICK RUBBER LINER

[75] Inventor: Theodore O. Martin, Jr., Wadsworth, Ohio

[73] Assignee: Chloeta F. Martin, Wadsworth, Ohio ; a part interest

[21] Appl. No.: 901,249

[22] Filed: Apr. 28, 1978

[51] Int. Cl.² .................. B32B 25/04; B32B 25/12; B32B 27/08
[52] U.S. Cl. .................. 428/421; 106/13; 260/29.6 F; 428/332; 428/422; 428/466; 428/492; 428/493; 428/515; 428/521
[58] Field of Search .............. 428/421, 466, 422, 220, 428/332, 492, 493, 515, 521; 427/207 A; 106/13; 264/211; 260/29.6 F

[56] References Cited
U.S. PATENT DOCUMENTS

| | | | |
|---|---|---|---|
| Re. 24,856 | 8/1960 | Panagrossi et al. | 427/207 A X |
| 2,017,593 | 10/1935 | Geer | 106/13 |
| 2,167,716 | 8/1939 | Harkins | 428/466 |
| 2,522,135 | 9/1950 | Schaffer | 428/466 |
| 2,681,324 | 6/1954 | Hochberg | 428/422 X |
| 2,705,691 | 4/1955 | Panagrossi et al. | 428/220 |
| 3,148,234 | 9/1964 | Boyer | 264/211 |
| 4,115,614 | 9/1978 | Martin | 428/466 X |

*Primary Examiner*—Thomas J. Herbert, Jr.
*Attorney, Agent, or Firm*—Oldham, Oldham, Hudak & Weber Co.

[57] ABSTRACT

A rubber liner for preventing build-up of materials, such as gypsum, in handling or storage facilities, comprises, by weight, 100 parts of a rubber elastomer, 10 to 30 parts of a fluorine-containing polymer and 5 to 20 parts of a compatible oil compound. Preferably, the liner also contains from 2 to 15 parts of a compatible grease. For improved adhesion to metal surfaces such as tanks and pipes, a laminate is made utilizing said non-stick rubber liner as an outer liner, utilizing a diffusion-resistant hard rubber layer as an intermediate layer, and utilizing a soft rubber layer designed for maximum rubber-to-metal adhesion as an interior layer.

22 Claims, 4 Drawing Figures

NON-STICK RUBBER LINER

BACKGROUND OF THE INVENTION

The present invention relates to a non-stick rubber liner. More specifically, the present invention relates to a rubber liner for tanks, pipes, process vessels, and the like for preventing build-up of solid materials; for example, gypsum build-up in the production of phosphoric acid.

Heretofore, teflon as well as oils, such as castor oil, have been used in various applications, but not as an intimate mixture with a rubber compound whereby a non-stick rubber liner is produced.

For example, U.S. Pat. No. 2,017,593 relates to the application of an oil to a rubber surface to reduce the adhesion of ice to the surface. It is not pertinent in that the oil is applied in combination with other oils to the surface of the rubber and, thus, is not intimately mixed therewith.

U.S. Pat. No. 2,681,324 relates to the application of a liquid polytetrafluoroethylene coating. Generally, this patent states that it is difficult to apply a film thickness in excess of 2.5 mills without having the coating crack. This patent allegedly solves this problem by forming a coating containing an aqueous dispersion of colloidal polytetrafluoroethylene particles in a mixture containing a modifying polymeric material and also containing a wetting agent. Table I of the specification sets forth some modifying materials, such as for example styrene-butadiene rubber. However, exceedingly high amounts, for example in excess of 60 percent of Teflon, are required. Moreover, not all modifying polymers work, see Example 14 wherein a styrene-butadiene copolymer was utilized. This patent is not pertinent in that it relates to aqueous dispersions of polytetrafluoroethylene containing a wetting agent and a high amount of a polymeric material.

U.S. Pat. Nos. 2,705,691 and Re. 24,856, are virtually identical. They relate to lamination or coatings of fluorine-substituted polyethylene with other substances. Generally, the joinder of the fluorine-substituted polyethylene to a substance is through a primed surface which may consist of a mixture of Teflon and a butyl rubber. This patent is not pertinent in that it relates to an adhesive bond, to an adhesive bond which contains high amounts of teflon (i.e., 50 percent or greater), to an adhesive binder, and thus not an outer layer, and completely fails to suggest the use of an oil.

U.S. Pat. No. 3,148,234 relates to a method of preparing filaments containing polytetrafluoroethylene emulsion along with a matrix polymer such as polystyrene, polybutadiene-styrene copolymers, polyisobutylene, and the like. In order to produce a fiber, an aqueous dispersion of polytetrafluoroethylene is made along with the polymer matrix. Thus, a wetting agent is also required. The matrix material in the produced fiber can be withdrawn by adequate means such as by heat destruction or extraction. Thus, the patent does not relate to a rubber liner, but rather to a fiber wherein the polymer matrix is preferably destroyed.

SUMMARY OF THE INVENTION

It is an object of the present invention to provide a non-stick rubber liner to prevent build-up of a solid material thereon.

It is another object of the present invention to provide a non-stick rubber liner, as above, wherein a small amount of a fluorine-containing polymer and a compatible oil is added to a rubber elastomer to form said rubber liner.

It is a further object of the present invention to provide a non-stick rubber liner, as above, wherein said fluorine-containing polymer utilized is in powdered form.

It is an additional object of the present invention to provide a non-stick rubber liner, as above, wherein said liner includes a compatible grease compound.

It is still another object of the present invention to provide a non-stick rubber liner, as above, wherein said fluorine-containing polymer is a fluorinated ethylene-propylene copolymer.

It is still another object of the present invention to provide a non-stick rubber liner, as above, wherein said compatible oil is castor oil.

It is still another object of the present invention to provide a non-stick rubber liner, as above, wherein said grease is molybdenum disulfide.

It is still another object of the present invention to provide a non-stick rubber liner, as above, wherein said liner prevents gypsum build-up as in phosphoric acid production.

It is still another object of the present invention to provide a non-stick rubber liner, as above, wherein said liner is utilized to form a laminate, said liner comprising an outer layer, a diffusion-resistant hard rubber comprising an intermediate layer, and a soft rubber designed for maximum rubber-to-metal adhesion comprising an interior layer.

It is still another object of the present invention to provide a non-stick rubber liner, as above, wherein said rubber liner or said laminate containing said rubber liner is cured after installation.

These and other objects of the present invention will become apparent from the detailed description of the drawings and specification.

In general, a non-stick rubber liner, comprises:

100 parts by weight of a rubber elastomer, said rubber elastomer selected from the class consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms;

from about 10 to about 30 parts by weight of a fluorine-containing polymer; and from about 5 to about 20 parts of an oil compound compatible with said rubber elastomer.

Additionally, a non-stick rubber laminate, comprises:

an exterior non-stick rubber liner, an intermediate rubber layer, and an interior rubber layer;

said exterior rubber liner comprising 100 parts by weight of a rubber elastomer, said rubber elastomer being selected from the class consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms;

from about 10 to about 30 parts by weight of a fluorine-containing polymer; and from about 5 to about 20 parts of an oil compound compatible with said rubber elastomer;

said intermediate rubber layer having a Shore D hardness of from about 60 to about 80, said rubber selected from the class consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms; and said interior rubber layer having a Shore A hardness of from about 30 to about 40, said rubber selected from the class consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms.

PREFERRED EMBODIMENT OF THE PRESENT INVENTION

Figure 3:
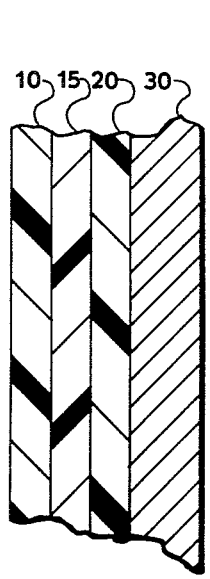
FIG. 3 is a cross-sectional view showing the laminate of the present invention applied to a straight metal substrate.
Figure 4:
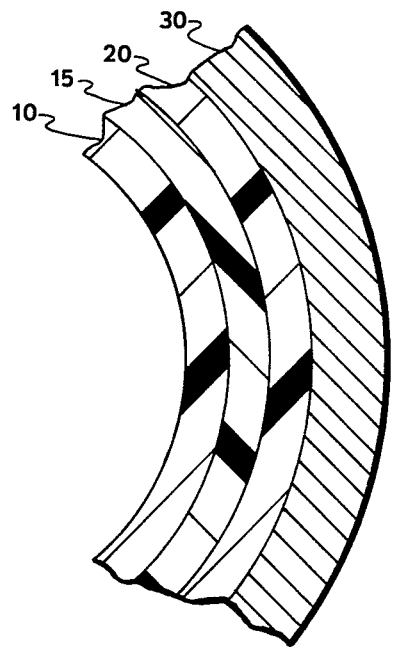
FIG. 4 is a cross-sectional view showing said laminate applied to a curved metal substrate.

According to the concepts of the present invention, a non-stick rubber liner can be utilized in various suitable situations, as in chemical processes wherein solids normally adhere to rubber-lined pipes, tanks, process vessels, and the like. The liner is particularly suitable in the production of phosphoric acid wherein a by-product, gypsum, usually builds up and adheres to conventional rubber liners for pipes and tanks and requires constant removal. Desirably, the rubber liner of the present invention is applied to a metal substrate in the form of a laminate as shown in FIGS. 3 and 4.

The rubber liner of the present invention indicated by the number 10, can generally be any type of rubber elastomer. Rubber elastomers, according to the present invention, include natural rubber, that is cis-1,4-polyisoprene obtained from "rubber-trees," various homopolymers or interpolymers such as copolymers made from diene monomers containing from 4 to 12 carbon atoms, and various copolymers made from vinyl substituted aromatic monomers containing from 8 to 12 carbon atoms and said diene monomers containing from 4 to 12 carbon atoms. Specific examples of diene monomers include cis-1,3-polyisoprene (synthetic natural rubber), isoprene (that is, containing both cis and trans isomers), butadiene, piperylene, hexadiene, heptadiene, octadiene, decadiene, dodecadiene, 2,3-dimethyl-1,3-butadiene, 2-methyl-1,3-pentadiene, 3,4-dimethyl-1,3-hexadiene, 4,5-diethyl-1,3-octadiene, 3-butyl-1,3-octadiene, and the like. Preferred monomers include isoprene, cis-1,3-polyisoprene and butadiene. Examples of various copolymers made from said dienes include butadiene-isoprene, piperylene-isoprene, butadiene-hexadiene, and the like. Examples of specific vinyl substituted aromatic monomers include styrene, alpha-methylstyrene, ortho-, para-, and meta-methyl, ethyl styrenes, and the like. Thus, specific examples of copolymers containing vinyl substituted aromatic monomers include styrene-butadiene (SBR), styrene-isoprene, alpha-methylstyrene and butadiene, and the like. A desirable copolymer is styrene-butadiene. A highly preferred rubber elastomer is natural rubber, that is cis-1,4-polyisoprene. Generally, the number average molecular weight of rubber elastomer 10 may range from about 10,000 to about 500,000 with a range of from 100,000 to about 400,000 being preferred.

Based upon 100 parts by weight of said rubber elastomer, from 10 to 30, desirably from 15 to 25, and optimally about 20 parts by weight of a fluorine-containing polymer is added. Examples of fluorine-containing polymers include polytetrafluoroethylene, polychlorotrifluoroethylene, poly(vinyl fluoride), poly(vinylidene fluoride), a copolymer made from tetrafluoroethylene and hexafluoropropylene monomers, a copolymer made from vinylidene fluoride and hexafluoropropylene monomers, a copolymer of vinylidene fluoride and chlorotrifluoroethylene monomers and a fluorinated ethylene-propylene copolymer. The preparation of the fluorine-containing polymers or copolymers are well known to those skilled in the art and such compounds may be utilized with any conventional comonomer content or at any available molecular weight. The copolymer of tetrafluoroethylene and hexafluoropropylene is desired, the polymer of polytetrafluoroethylene is preferred, and the fluorinated ethylene-propylene copolymer is highly preferred. A specific example of a commercial fluorinated ethylene-propylene copolymer is TL-120, manufactured by the Liquid Nitrogen Processing Corporation. This copolymer generally has a molecular weight range of 100,000 to 5,000,000 and contains from about 80 to 98 percent, usually 95 percent by weight, of fully saturated fluorine-ethylene repeating units, with the remainder being fully saturated fluorine-propylene repeating units.

It is an important aspect of the present invention that the fluorine-containing polymer must be of a very small size, that is a powder, so that it can be blended or mixed with the various compounds to produce the rubber liner. Otherwise, good non-stick results will generally not be obtained. Generally, the smaller the particle size, the better. Generally, 90 percent of the particle sizes, according to the Micromerograph method, is 100 microns or less, and desirably 50 microns or less. A preferred size for 90 percent of the particles is 20 microns or less with 12 microns or less being highly preferred.

Also required is the addition of from about 5 to about 20 parts by weight, preferably from about 8 to about 15, and optimally about 10 parts of an oil compound which is mixable with said rubber elastomer. Preferably, a portion of said oil compound will slowly bleed out from said elastomer with time, even when vulcanized, and this property is an important aspect of the present invention. Examples of such oil compounds include castor oil and conventionally known mineral oils. Generally, the oil and the powdered fluorine-containing polymer is simply added to the rubber, as on a mill, in an internal mixer, in a Banbury mixer, or any conventional mixing apparatus, and blended. The blending temperature is generally from about 125° F. to about 175° F.

Although the powdered fluorine-containing polymer and the mixable oil compound will give improved non-stick results, it is preferred that a grease also be added. Generally, from about 2 to about 15 parts by weight, preferably from about 3 to about 7 parts by weight, and optimally from about 5 parts by weight of a grease which is compatible or mixable with said elastomer blend is added in a similar manner and blended. Greases which impart non-stick or slippery surface characteristics to the liner are preferred. Specific examples of such grease compounds include a lithium-based grease, molybdenum disulfide, and the like. Molybdenum disulfide is highly preferred in the present invention.

In addition to the above-identified compounds which, when blended with the rubber, yield a non-stick rubber elastomer, desirable amounts of various conventional compounds or compounding agents may be added to the rubber to improve its physical properties as is well known to those skilled in the art. Thus, for example, carbon black, zinc oxide, silica, various clays, waxes and fibers may be utilized along with a host of other compounds such as fillers, antioxidants, anti-ozonants, accelerators, processing agents, and the like, as are well known and understood by those skilled in the art. Additionally, preferably conventional curing agents (such as sulfur or organic peroxide) are added in sufficient amounts in order to cure the rubber upon heating.

Once the rubber elastomer has been compounded, it is generally produced in sheet-like form on a mill. The thickness of rubber elastomer liner 10 is not important and may vary from very thin, such as a 0.01 of an inch, to very thick, such as about 0.35 of an inch, depending upon the particular application and the like.

Rubber liner 10, comprising the ingredients set forth above, has been found to have good non-stick properties with regard to solid materials or solid-forming materials which generally adhere to metal-type articles such as pipes, tanks, and the like. Rubber liner 10 is particularly suitable with regard to lining pipes, tanks, etc., which are utilized in the production of phosphoric acid. That is, in the production of phosphoric acid, phosphates containing earth, rocks, and the like are treated with sulfuric acid or hydrochloric acid to yield phosphoric acid. As a by-product, gypsum (calcium sulfate) is formed. This compound readily builds up, even on conventional rubber-lined metal handling and processing equipment. Hence, downtime is required to remove it. Rubber liner 10 of the present invention may be directly applied to such metal equipment and results in virtually little or no build-up over long periods of time. Desirably, rubber liner 10, containing a curing agent, is applied directly to the metal surfaces of a tank car and heat applied to cure the rubber. Generally, for non-tank cars and other uses such as holding tanks, storage tanks, piping, etc., a laminate which contains rubber liner blend 10 as an outer layer is preferred.

Figure 1:
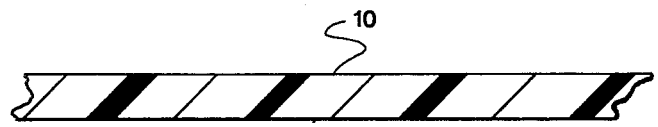
FIG. 1 is a cross-sectional view of a rubber elastomer liner according to the present invention.
Figure 2:
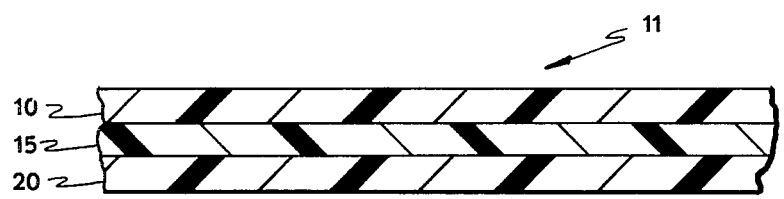
FIG. 2 is a cross-sectional view showing the rubber liner of the present invention as part of a laminate.

FIG. 2 shows a preferred 3-layer laminate 11. The above-described rubber elastomer blend constitutes exterior liner 10. An intermediate or central layer 15 is made from a hard rubber. By a hard rubber, it is meant that the rubber elastomer has a Shore D hardness from about 60 to about 80 mills, with approximately 70 being preferred. Interior layer 20 is made from a soft rubber material, that is a rubber elastomer which has a Shore A hardness of from about 30 to about 40 mills, with approximately 35 being preferred. The soft layer permits maximum rubber-to-metal adhesion. Naturally, laminate 11 can contain any number of layers so long as an interim portion is made of a "soft" rubber elastomer, an intermediate portion is made of a "hard" rubber elastomer, and an exterior portion is made of a non-stick rubber liner.

The rubber utilized in intermediate layer 15 or interior layer 20 may be any specific rubber material as set forth above with regard to rubber liner layer 10. Preferably, layers 15 and 20 are made from polyisoprene, polybutadiene, or synthetic rubber (that is from monomers of cis-1,3-polyisoprene). Natural rubber is highly preferred. As with rubber liner 10, layers 15 and 20 may be of any desirable thickness such as from a few one hundredths of an inch to one or two inches. Additionally, they may be compounded with any amount of various compounding agents such as those set forth above with regard to rubber liner layer 10. Preferably, intermediate layer 15 and interior layer 20 contain a curing agent such as sulfur or an organic peroxide so that once laminate 11 is placed in position, it can be cured. Laminate 11 naturally can be utilized on any substrate metal or non-metal and the soft rubber interior layer 20 gives good adhesion when applied to metals. FIG. 3 shows laminate 11 applied to a straight metal substrate 30, whereas FIG. 4 shows laminate 11 applied to a curved metal substrate 30 such as a pipe or a tank.

The invention will be better understood by referring to the following example.

A rubber liner layer 10 was prepared according to the following recipe:

| RUBBER LINER RECIPE | |
|---|---|
| COMPOUND | PARTS BY WEIGHT |
| Natural rubber (constant viscosity 60-premasticated) | 100 |
| Zinc oxide | 1.05 |
| Stearic acid | .50 |
| Agerite Resin E (polymerized 1,2-dihydro-2,2,4-trimethylquinoline), manufactured by R. T. Vanderbilt Co. | 1.05 |
| Sulfur (spider-type) | 2.10 |
| TMTD (tetramethylthiuramdisulfide) | .16 |
| Circosol 4240 - a processng oil, manufactured by Sun Oil Co. | 1.50 |
| Castor oil | 10.0 |
| Fluorinated ethylene-propylene copolymer TL 120, manufactured by Liquid Nitrogen Processing Corporation | 20.0 |
| Molybdenum disulfide | 5.0 |

The rubber was mixed on the mill for 40 minutes at 200° F. The sheet was then calendared with the top calendar roll temperature being 190° F., the middle roll temperature being 180° F., and the bottom roll temperature being ambient.

An intermediate layer 15 was made according to the same recipe except that rubber layer 15 was made from tree grown natural rubber, and the castor oil, the fluorinated ethylene-propylene copolymer and the molybdenum disulfide compounds were deleted. This blend was mixed on a mill from 3 to 5 minutes at 175° F. and then transferred to a calendar roll as above and sheeted.

In a similar manner, an interior rubber layer 20 was prepared according to the above recipe except that 100 parts of tree grown natural rubber were utilized and the last three compounds of the recipe were also not included in the blend. The rubber was then mixed on a mill from 3 to 5 minutes at 175° F. and then transferred to a calendar roll wherein it was sheeted. The three layers were then placed upon each other and applied to piping (including dip pipes and elbows). The pipes were placed in an autoclave and cured by using steam at 260° F. Such temperature was maintained for 3 hours whereupon the laminate was cured.

Fluid containing gypsum was then allowed to flow through said piping whereupon, after 9 months, virtually no build-up of gypsum occurred. In comparison, the laminate containing an outer natural rubber layer without applicant's non-stick additives had severe gypsum build-up after 5 to 20 days. Thus, it is apparent that applicant's specially formulated rubber liner layer 10 produces clearly unexpected and improved results.

While in accordance with the patent statutes, only the preferred embodiment has been illustrated and described in detail, many modifications of the invention may be made without departing from the spirit of the invention disclosed and described herein, the invention being measured by the scope of the attached claims.

What is claimed is:

1. A non-stick rubber liner directly applied to metal equipment, comprising:
   a blend, said blend having thoroughly mixed therein 100 parts by weight of a rubber elastomer, said rubber elastomer selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms;
   from about 10 to about 30 parts by weight of a fluorine-containing polymer, 90% of said fluorine-containing polymer having a particle size of 100 microns or less; and
   from about 5 to about 20 parts of an oil compound compatible with said rubber elastomer, so that said mixed blend while directly applied to the metal equipment resists gypsum build-up.

2. A non-stick rubber liner according to claim 1, wherein said fluorine-containing polymer is a powder, said fluorine-containing polymer selected from the group consisting of polytetrafluoroethylene, polychlorotrifluoroethylene, poly(vinyl fluoride), poly(vinylidene fluoride), a copolymer of polytetrafluoroethylene and hexafluoropropylene, a copolymer of vinylidene fluoride and hexafluoropropylene, a copolymer of vinylidene fluoride and chlorotrifluoroethylene, and a fluorinated ethylene-propylene copolymer, and wherein said oil is a compound which will bleed from said rubber.

3. A non-stick rubber liner according to claim 2, wherein said rubber compound is selected from the group consisting of natural rubber, polyisoprene, polybutadiene, and a polymer made from cis-1,3-polyisoprene, wherein said fluorine-containing polymer is selected from the group consisting of a copolymer of polytetrafluoroethylene and hexafluoropropylene, a fluorinated ethylene-propylene copolymer, and polytetrafluoroethylene, and wherein said oil is castor oil.

4. A non-stick rubber liner according to claim 3, wherein said rubber compound is natural rubber, wherein said fluorine-containing polymer is a fluorinated ethylene-propylene copolymer, and the amount of said copolymer is from 15 to 25 parts, wherein 90 percent of said powdered fluorinated ethylene-propylene copolymer has a particle size of 12 or smaller, and wherein said castor oil ranges from about 8 to about 15 parts.

5. A non-stick rubber liner according to claim 2, including from about 2 to about 15 parts by weight of a rubber elastomer compatible grease.

6. A non-stick rubber liner according to claim 5, wherein said rubber is selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms; wherein said fluorine-containing polymer is selected from the group consisting of polytetrafluoroethylene, polychlorotrifluoroethylene, poly(vinyl fluoride), poly(vinylidene fluoride), a copolymer of polytetrafluoroethylene and hexafluoropropylene, a copolymer of vinylidene fluoride and hexafluoropropylene, a copolymer of vinylidene fluoride and chlorotrifluoroethylene, and a fluorinated ethylene-propylene copolymer wherein said grease is selected from the group consisting of a lithium-based grease and molybdenum disulfide, and wherein said oil bleeds from said rubber and is selected from the group consisting of mineral oil and castor oil.

7. A non-stick rubber liner according to claim 6, wherein the amount of said fluorine-containing polymer ranges from 15 parts of 25 parts, wherein the amount of said oil ranges from about 8 parts to about 15 parts, and wherein the amount of said grease ranges from about 3 parts to about 7 parts, and wherein the particle size of said fluorine-containing polymer powder is such that 90 percent of said powder has a particle size of 100 microns or less.

8. A non-stick rubber liner according to claim 7, wherein said rubber is selected from the group consisting of natural rubber, polyisoprene, polybutadiene, and a polymer made from cis-1,3-polyisoprene, wherein said fluorine compound is selected from the group consisting of a copolymer of polytetrafluoroethylene and hexafluoropropylene, a fluorinated ethylene-propylene copolymer, and polytetrafluoroethylene, and wherein 90 percent of the particle size of said fluorine-containing polymer powder is 50 microns or smaller.

9. A non-stick rubber liner according to claim 7, wherein said rubber is natural rubber, wherein said fluorine-containing polymer is a fluorinated ethylene-propylene copolymer, wherein said oil is castor oil, and wherein said grease is molybdenum disulfide.

10. A non-stick rubber liner according to claim 9, wherein the amount of said fluorinated ethylene-propylene copolymer is approximately 20 parts, wherein the amount of said castor oil is about 10 parts, and wherein the amount of said molybdenum disulfide grease is about 5 parts.

11. A non-stick rubber liner according to claim 10, wherein 90 percent of the particle sizes of said fluorine polymer is 12 microns or smaller.

12. A non-stick rubber laminate, comprising:
   an exterior non-stick rubber liner, an intermediate rubber layer, and an interior rubber layer;
   said exterior rubber liner comprising a blend having 100 parts by weight of a rubber elastomer, said rubber elastomer being selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms;
   from about 10 to about 30 parts by weight of a fluorine-containing polymer, 90% of said fluorine-containing polymer having a particle size of 100 microns or less; and from about 5 to about 20 parts of an oil compound compatible with said rubber elastomer;

said intermediate rubber layer having a Shore D hardness of from about 60 to about 80, said rubber selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms; and said interior rubber layer having a Shore A hardness of from about 30 to about 40, said rubber selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms.

13. A non-stick rubber laminate according to claim 12, wherein said fluorine-containing polymer is a powder, said fluorine-containing polymer selected from the group consisting of polytetrafluoroethylene, polychlorotrifluorethylene, poly(vinyl fluoride), poly(vinylidene fluoride), a copolymer of polytetrafluoroethylene and hexafluoropropylene, a copolymer of vinylidene fluoride and hexafluoropropylene, a copolymer of vinylidene fluoride and chlorotrifluoroethylene, and a fluorinated ethylene-propylene copolymer, and wherein said oil is a compound which will bleed from said rubber.

14. A non-stick rubber laminate according to claim 13, wherein said rubber elastomer of said exterior liner, said intermediate layer, and said interior liner is selected from the group consisting of natural rubber, polyisoprene, polybutadiene, and a polymer made from cis-1,3-polyisoprene, wherein said fluorine-containing polymer is selected from the group consisting of a copolymer of polytetrafluoroethylene and hexafluoropropylene, a fluorinated ethylene-propylene copolymer, and polytetrafluoroethylene, and wherein said oil is castor oil.

15. A non-stick rubber laminate according to claim 14, wherein said rubber liner, said intermediate layer, and said interior layer is natural rubber, wherein said fluorine-containing polymer is a fluorinated ethylene-propylene copolymer, and the amount of said copolymer is from 15 to 25 parts, wherein 90 percent of said powdered fluorinated ethylene-propylene copolymer has a particle size of 12 or smaller, and wherein said castor oil ranges from about 8 to about 15 parts.

16. A non-stick rubber laminate according to claim 13, wherein said rubber liner contains from about 2 to about 15 parts by weight of a rubber elastomer compatible grease.

17. A non-stick rubber laminate according to claim 16, wherein said rubber in said rubber liner, said intermediate layer, and said interior layer is selected from the group consisting of (a) natural rubber, (b) a polymer made from diene monomers having from 4 to 12 carbon atoms, (c) a copolymer made from diene monomers having from 4 to 12 carbon atoms, and (d) a copolymer made from vinyl substituted aromatic monomers having from 8 to 12 carbon atoms and diene monomers having from 4 to 12 carbon atoms; wherein said fluorine-containing polymer is selected from the group consisting of polytetrafluoroethylene, polychlorotrifluoroethylene, poly(vinyl fluoride), poly(vinylidene fluoride), a copolymer of polytetrafluoroethylene and hexafluoropropylene, a copolymer of vinylidene fluoride and hexafluoropropylene, a copolymer of vinylidene fluoride and chlorotrifluoroethylene, and a fluorinated ethylene-propylene copolymer, wherein said grease is selected from the group consisting of a lithium-based grease and molybdenum disulfide, and wherein said oil bleeds from said rubber and is selected from the group consisting of mineral oil and castor oil.

18. A non-stick rubber laminate according to claim 17, wherein the amount of said fluorine-containing polymer ranges from 15 parts to 25 parts, wherein the amount of said oil ranges from about 8 parts to about 15 parts, and wherein the amount of said grease ranges from about 3 parts to about 7 parts, and wherein the particle size of said fluorine-containing polymer powder is such that 90 percent of said powder has a particle size of 100 microns or less.

19. A non-stick rubber laminate according to claim 18, wherein said rubber in said rubber liner, said intermediate layer, and said interior layer is selected from the group consisting of natural rubber, polyisoprene, polybutadiene, and a polymer made from cis-1,3-polyisoprene, wherein said fluorine compound is selected from the group consisting of a copolymer of polytetrafluoroethylene and hexafluoropropylene, a fluorinated ethylene-propylene copolymer, and polytetrafluoroethylene, and wherein 90 percent of the particle size of said fluorine-containing polymer powder is 50 microns or smaller.

20. A non-stick rubber laminate according to claim 19, wherein said rubber in said rubber liner, said intermediate layer, and said interior layer is natural rubber, wherein said fluorine-containing polymer is a fluorinated ethylene-propylene copolymer, wherein said oil is castor oil, and wherein said grease is molybdenum disulfide.

21. A non-stick rubber laminate according to claim 20, wherein the amount of said fluorinated ethylene-propylene copolymer is approximately 20 parts, wherein the amount of said castor oil is about 10 parts, and wherein the amount of said molybdenum disulfide grease is about 5 parts.

22. A non-stick rubber laminate according to claim 21, wherein 90 percent of the particle size of said fluorine polymer is 12 microns or smaller.

* * * * *